United States Patent
Melker et al.

(10) Patent No.: US 6,535,714 B2
(45) Date of Patent: Mar. 18, 2003

(54) METHOD, SYSTEM, AND APPARATUS FOR MEDICAL DEVICE TRAINING

(75) Inventors: Richard J. Melker, Gainesville, FL (US); Johannes H. Van Oostrom, Gainesville, FL (US)

(73) Assignee: University of Florida, Gainesville, FL (US)

( * ) Notice: Subject to any disclaimer, the term of this patent is extended or adjusted under 35 U.S.C. 154(b) by 9 days.

(21) Appl. No.: 09/897,149

(22) Filed: Jul. 2, 2001

(65) Prior Publication Data

US 2002/0001794 A1 Jan. 3, 2002

Related U.S. Application Data (60) Provisional application No. 60/215,574, filed on Jun. 30, 2002.

(51) Int. Cl.[7] .............................................. G09B 23/28
(52) U.S. Cl. ...................... 434/350; 434/262; 434/429
(58) Field of Search ............................. 434/350, 262, 434/265, 272, 118, 201, 365, 429, 433

(56) References Cited

U.S. PATENT DOCUMENTS

| | | | |
|---|---|---|---|
| 3,520,071 A | 7/1970 | Abrahamson et al. ...... 434/265 |
| 5,403,192 A | 4/1995 | Kleinwaks et al. ......... 434/272 |
| 5,727,950 A | 3/1998 | Cook et al. | |
| 5,853,292 A | 12/1998 | Eggert et al. ................ 434/262 |
| 5,900,923 A | 5/1999 | Prendergast et al. ........ 351/221 |
| 5,941,710 A | 8/1999 | Lampotang et al. ......... 434/272 |
| 6,024,539 A | 2/2000 | Blomquist .................... 417/63 |
| 6,074,213 A | 6/2000 | Hon | |
| 2002/0002326 A1 * | 1/2002 | Causey et al. .............. 600/300 |
| 2002/0076679 A1 * | 6/2002 | Aman ......................... 434/262 |
| 2002/0082664 A1 * | 6/2002 | Kerver ........................ 607/30 |

FOREIGN PATENT DOCUMENTS

EP  0 838 798 A1  4/1998

OTHER PUBLICATIONS

Jamal R: "Virtuelle Instrumente—Gestern, Heute, Morgen," Electronik, Franzis Verlag GMBH, Munchen, DE, vol. 45, NR 26, pp. 50–55 English translation enclosed.

* cited by examiner

Primary Examiner—Hieu T. Vo
(74) Attorney, Agent, or Firm—Saliwanchik, Lloyd & Saliwanchik (57) ABSTRACT

A method, system, and apparatus for training users in understanding and use of numerous medical devices, including providing for documentation of competency during the training exercise is provided. Preferably, the invention will utilize an "interface module" (e.g., hand-held device, palm size, laptop, desktop PC, microcontroller, expansion module on a palm/hand-held device) to provide the training interface between the user and the device.

20 Claims, 3 Drawing Sheets

METHOD, SYSTEM, AND APPARATUS FOR MEDICAL DEVICE TRAINING

This application claims priority to U.S. Provisional Application Ser. No. 60/215,574, incorporated herein by reference filing date Jun. 30, 2002.

FIELD OF INVENTION

The present invention relates to medical device training, and, more particularly, to a method, system, and apparatus for training users in the understanding and use of numerous medical devices, including providing for documentation of competency during the training exercise.

BACKGROUND INFORMATION

Medical devices are an integral and indispensable component of patient care. However, they present a number of unique problems that have not been adequately addressed by device manufacturers or the medical community in general. There is ample evidence that errors in the understanding and use of medical devices are responsible for considerable morbidity and mortality. Recently, government agencies have begun to look more closely at the ability of medical institutions as well as manufacturers to accurately assess the dangers presented by medical devices. Further, the FDA has mandated the use of "human factors" experts in the design of medical devices to reduce the complexity of the device/human interface.

Learning to use various medical devices is often taught through textbooks, manuals, lectures, and videotapes. Obviously, while providing a low cost source for learning theory, these informational resources clearly lack the important benefit that can only be acquired from "hands-on" training and practice with the actual device. A number of manufacturers in other industries have designed interactive training systems (software based) to help users learn their specific systems, especially in the flight industry (e.g., Microsoft Flight Simulator™). For example, a manufacturer may include a video, computer program, or interactive web site to illustrate and present step by step instructions on the proper use. A software program with a simulated image of the device controls may also allow a user to practice using a specific device (e.g., U.S. Pat. No. 6,024,539 to Blomquist which discloses a computer image of an infusion pump with various programs for simulating operation of the manufacturer's pump). Each of these training systems are designed solely for the specific instrument being taught.

In order to teach the use of multiple instruments, especially in the medical arena, there are presently available patient simulator mannequins to provide "hands-on" training to medical personnel in areas such as trauma treatment and anesthesiology. These mannequins typically have significant capabilities including spontaneous breathing, pulse, heart and breath sounds and the ability to monitor vital signs such as ECG, pulse oximetry and end-tidal carbon dioxide by connecting commercial off-the-shelf (COTS) medical devices to the simulator. Various medical devices can be attached to these mannequinsto train users in the proper implementation and use (e.g., endotracheal tube, EKG monitor, blood pressure cuff, pulse oximeter, automatic external defibrillator). These mannequins are typically computer controlled and are programmed for a variety of responses which simulate medical conditions. Examples of such mannequins are disclosed in U.S. Pat. No. 5,941,710 to Lampotang, et. al., U.S. Pat. No. 5,900,923 to Prendergast, et al., U.S. Pat. No. 5,403,192 to Kleinwaks et al., and in U.S. Pat. No. 3,520,071 to Abrahamson et al., the disclosures of which are incorporated herein by reference.

Using patient simulator mannequins such as these, the students, nurses, medical personnel, etc. can develop skills in manual dexterity and proper placement of leads, tubes, etc. without risk. However, learning to use a variety of medical devices by attaching them to such simulator mannequins is not feasible, since access to full-scale patient simulator mannequins is generally not readily available and requires a large capital outlay for the equipment. Moreover, not all devices integrate with such mannequins. Even more problematic is that not all functions of medical devices involve direct patient response (e.g., setting alarms, recording outputs, communicating with other devices, setting preferences, and the like).

One unique approach was taken in U.S. Pat. No. 5,853,292 to Eggert, et al., which discloses using sensor-equipped "virtual" instruments interfaced with a patient simulator through a computer interface module (CIM). The CIM confirms correct placement of the various instruments onto the patient. The system is used in conjunction with a training program on a computer. For example, a user can select the CPR training session. The screen displays include sequential actions which integrate the basic concepts of CPR. The session may be recorded and the results displayed. This system, however, carries over the same disadvantage of the above-noted patient simulators in that it still requires a large capital outlay for the equipment and uses only virtual (rather than real) medical devices.

Accordingly, there is a need in the art for a method, system and apparatus that provides medical device training in a user friendly, cost effective way.

BRIEF SUMMARY OF THE INVENTION

The present invention solves the needs in the art by providing a method, system, and apparatus for training users in the understanding and use of numerous medical devices, including providing for documentation of competency during the training exercise. The invention can also be used to train the lay public on consumer medical devices. The apparatus of the invention serves as a training interface module to provide a common hardware platform that can be connected to various medical devices regardless of manufacturer and enables users to learn at their own pace, receive remediation when necessary, and provide documentation of proficiency with the device.

In a preferred embodiment, the invention comprises a training interface apparatus for teaching proper use of a variety of medical devices, which includes a processor; a computer program under control of the processor that provides interactive training sessions to the user for each of the medical devices; a user interface under control of the processor for receiving input from a user; a display unit operable to display an output corresponding to the interactive training sessions; and communications means for interfacing with the medical devices.

The interactive training session may be loaded onto a storage device of the training apparatus from an external communications network, from at least one of the plurality of devices, from a removable storage media, or it may reside on a storage device of the training apparatus. The interactive training session may be launched upon selection by the user or may be automatically launched when a device is connected to the training interface apparatus. The display unit may include a simulated image that resembles the device such that the simulated image shows graphical representations of the controls which are actuated by the user interface. The simulated image may also include representations of the output of the device. The user interface may include an external input device interfaced with the training interface apparatus or an integrated input device of the training interface apparatus. In another embodiment, the user interface is a communications interface operatively connected between the device and the training interface apparatus for detecting inputs directly from the controls of the device. It may further include a communications port for standard input/output functions.

The interactive training session includes, for example, a lesson on applicable physiology related to the device, a lesson on instrument physics related to the device, a lesson on operation of the device, including inputs and outputs, a lesson on pathophysiology that describes the use of the device with patients in different disease states, and a lesson on patient management exercises which manages aspects of a simulated patient. The training session also includes educational content (e.g., user interactions, testing, and educational materials). The interactive training session tracks progress of a user and adjusts the lessons based on the progress.

As a method for teaching proper use of a variety of medical devices, the present invention comprises the steps of: (a) identifying a medical device connected via communications means to a training interface apparatus; (b) loading training software specific for the medical device; and (c) running the training software. More specifically, in an embodiment, the method includes: (a) identifying a device interfaced with a training interface apparatus; (b) loading training software specific to the identified device on said apparatus; (c) running the training software; (d) receiving inputs representing operation of controls of the identified device; (e) tracking progress of the operation of controls; and (f) adjusting the training software based on said progress.

As a computer program embodied on a computer-readable medium that provides interactive training sessions, the present invention comprises: a code segment that identifies a medical device connected via communications means to a training interface apparatus; a code segment that loads training software specific for the medical device for execution during the training sessions; and a code segment that runs the training software.

As a system for teaching proper use of a variety of medical devices, the present invention comprises: a training interface apparatus connectable to a variety of medical devices, the training interface comprising input means and output means; and a computer program residing in the training interface apparatus which identifies a specific connected medical device and runs a corresponding training session for that device.

Features of the invention can be implemented in numerous ways, including as a system, a method, an apparatus, a computer site, or a computer readable medium. Portions of the invention may utilize a communications infrastructure, for example the Internet, for centralized control and/or remote interactivity. Several embodiments of the invention are discussed below.

As a computer system, the invention generally includes a processor unit with associated hardware and a display. This can be a general purpose computing device (e.g., IBM compatible personal computer, Apple Macintosh computer, UNIX based workstation, Palm OS device, Windows CE device) programmed according to the unique aspects of the invention or a specially programmed apparatus (e.g., microcontrolled hand-held device). The system operates to provide interactive training of multiple devices and record the results. Preferably, the device is programmed to allow training for and interfacing with various types of devices, regardless of manufacturer.

As a computer readable medium containing program instructions for providing interactive training of multiple devices, an embodiment of the invention includes computer readable code for communicating with various medical devices, providing interactive training of users for those devices, processing training data, and recording/transmitting results.

Part or all of the training session and results therefrom can be sent electronically and maintained on a web server for confidential access with typical browsers as a web site. The computer web site is preferably viewed with a client web browser as an HTML document through a web secure server communicating with an application server having a database associated therewith. The data may also be transmitted and viewed by other well known techniques such as email, interactive television, and the like.

The advantages of the invention are numerous. First and foremost, the invention provides medical device training in a user friendly, cost effective way. A resulting advantage is reduced errors in the understanding and use of medical devices, ultimately leading to saved lives.

The invention will now be described, by way of example and not by way of limitation, with reference to the accompanying sheets of drawings and other objects, features and advantages of the invention will be apparent from this detailed disclosure and from the appended claims. All patents, patent applications, provisional applications, and publications referred to or cited herein, or from which a claim for benefit of priority has been made, whether supra or infra, are incorporated by reference in their entirety to the extent they are not inconsistent with the explicit teachings of this specification.

DETAILED DESCRIPTION OF THE INVENTION

The present invention provides a method, system, and apparatus for training users in the understanding and use of numerous medical devices, including providing for documentation of competency during the training exercise. Preferably, the invention will utilize an "interface module" (e.g., hand-held device, palm size, laptop, desktop PC, microcontroller) to provide the user interface between the user and the device. The interface module preferably provides a common hardware platform that can be connected to various medical devices regardless of manufacturer and is capable of being used as a training module (hereinafter referred to as a "part-task" trainer (PTT)) to enable users to learn at their own pace, receive remediation when necessary, and provide documentation of proficiency with the device.

Figure 1:
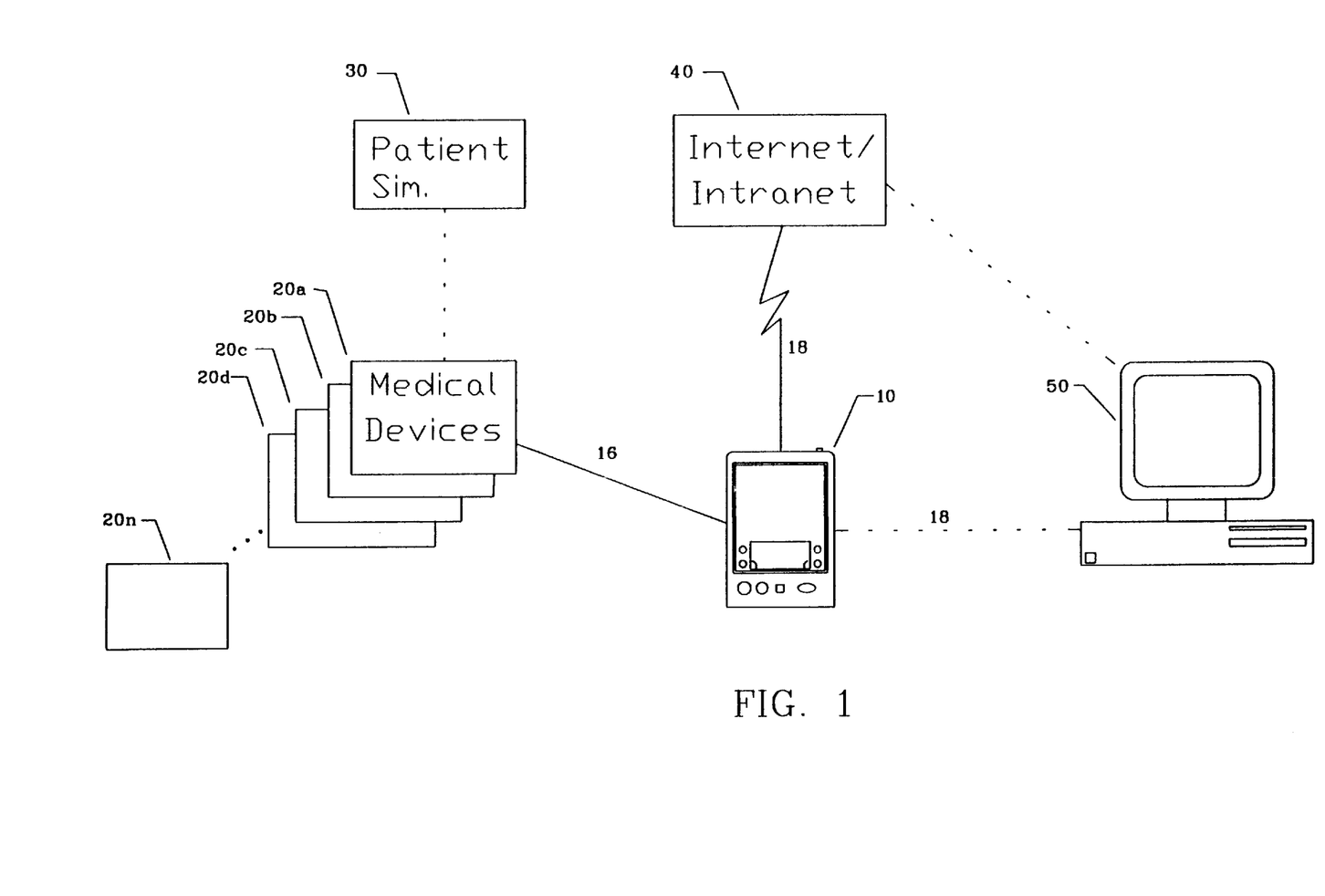
FIG. 1 shows a block diagram of one embodiment of the training apparatus of the present invention coupled to a medical device for training.
Figure 2:
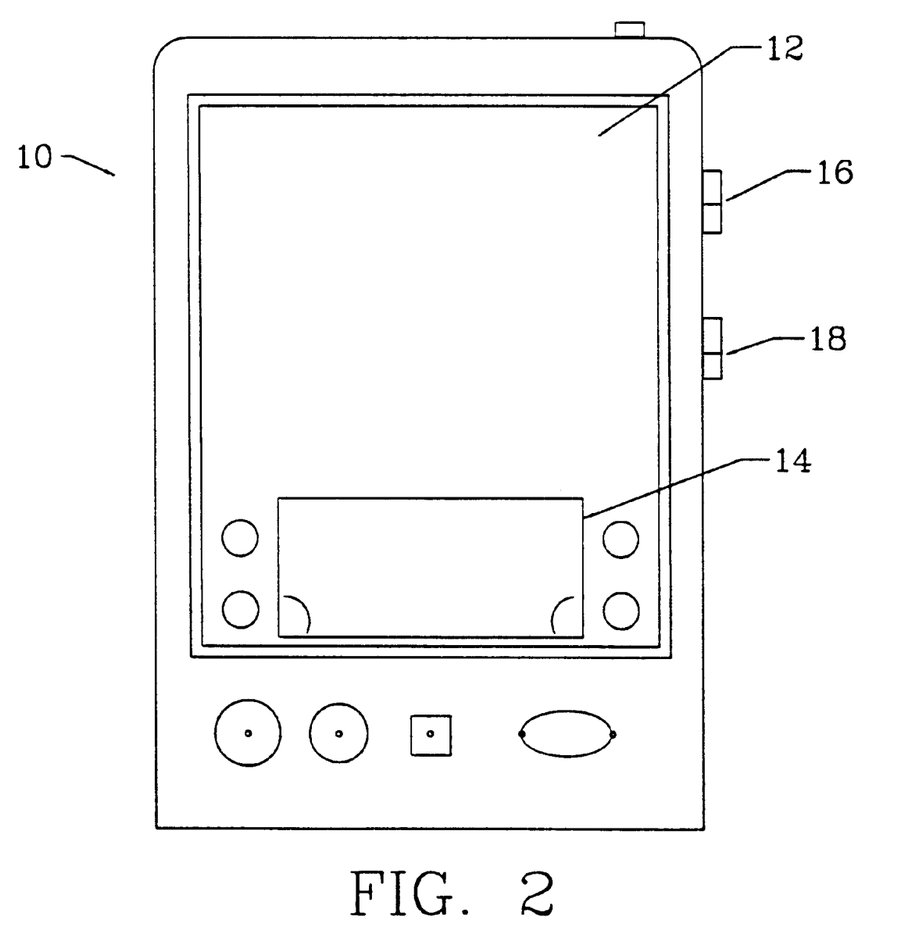
FIG. 2 shows a detailed view of one embodiment of the PTT of the present invention.

Referring now to FIGS. 1 and 2, the reference numeral 10 refers, in general, to the PTT of the present invention. The PTT 10 preferably comprises a microprocessor (CPU) and associated software/hardware. The PTT 10 also includes a display 12, an input means 14 (such as a keyboard, touch pad, touch screen, custom input pad, etc.), device communication port(s) 16, and standard communication port(s) 18. The PTT 10 serves as an "interface module" to provide the user interface between the user and the device(s) 20a, b, c, . . . 20n to be trained on. In a most preferred embodiment, the PTT is designed as a portable hand-held "tablet" configuration.

For certain medical devices capable of communicating with the PTT 10, the user may train by practicing on the actual medical device's input controls, etc. For devices which are not capable of communication (mechanical devices), the user can train using the input means 14 of the PTT 10 during the training session. For still other devices, a combination of device input controls and PTT inputs may be utilized during training.

The PTT 10 can be battery powered or utilize a conventional power source such as a wall AC outlet. A speaker (not shown) may also be included on the PTT 10 for audio output along with necessary volume control. The PTT 10 includes a number of ports for communication. The PTT 10 is connected to the device 20 via a device communication port 16 such as an RS232 interface (any suitable interface may be utilized such as parallel, serial, USB, SCSI, infrared, and the like). Other communication ports 18 on the PTT 10 can be used for standard I/O functions such as Internet communications, printer controls, docking, and the like. Communications can be through modems over any suitable communications medium such as conventional telephone lines, cellular phones, fiber optics links, satellite links, or others.

The PTT 10 includes a processor unit (e.g., CPU, RISC-based processor, and the like) for interfacing with the devices and performing the necessary training functions. The PTT 10 can include internal memory for storage or removable storage media. In use, the device 20 may also be connected to a patient simulator 30. Moreover, the PTT 10 may be interfaced with the patient simulator 30.

Preferably, the software for training and communications is pre-loaded onto the PTT 10. Alternately, the software for training/communications can reside on the device 20 itself, be transferred from the device 20 to the memory of the PTT 10, be loaded from storage media (e.g., floppy disk, CD-ROM, ZIP disk) into the PTT 10, be downloaded from any external communications network 40 or computing device 50 (e.g., Internet, intranet, external PC, docking station).

The training software is written in any suitable programming language for operation on the PTT. While not shown, it is understood that the program may be stored on a computer-readable medium and is executed by the processor of the PTT. The screen displays of the program are understood to be presented in the display 12 or computer monitor if the PTT is a programmed computer rather than a hand-held device.

Configurations other than the preferred "hand-held" embodiment for the PTT are also envisioned (including desktop, laptop, Palm OS™ and Windows CE™ based devices). For example, a training system may be programmed into a computer to use the display on a computer system to provide the user interface and the serial/parallelor other I/O ports for interface with the medical device.

In one embodiment, an image of the medical device that resembles the actual device utilized may be presented on the computer screen as part of the training. The image may include representations of the controls (e.g., keys, buttons, dials) and the display (or other output) of the medical device. For devices which have electronic interfaces, the computer is programmed such that the image of the device is utilized to communicate with an actual device by interacting with the image. The controls on the image of the device can be activated by such techniques as through the use of a mouse, keyboard, or touch screen. Alternately, a specialized hardware input device may be designed for user interface (similar to computer gaming controls, keypads, and the like, to more closely simulate analog-type dials, pressure sensitive controllers, slides, multi-position switches). This system may be used as a simulator for training how to use the medical device. The simulator includes various programs for simulating various device operations and situations.

In a preferred embodiment, the PTT 10 will be capable of connecting to any medical device with an RS-232 port or other means of communications. The PTT 10 will contain software designed to recognize and communicate with the medical device and software that will train the user in medical information related to the device as well as detailed instructions on the use of the device.

The PTT 10 can also be designed as part of a kiosk training station.

The PTT 10 may be embedded directly into the medical device itself so that the device itself comes with the necessary software and interfaces for the training.

In a preferred embodiment, the PTT contains one or more of the following: a) communications software capable of interfacing with a wide variety of medical devices; b) standard communications software and hardware for Internet or other connections; c) device specific software for training the user in the use of a specific medical device; d) a software shell containing information common to a large number of medical devices that can be used in conjunction with the device specific software; e) additional education software for tutoring the user in areas of documented deficiencies related to the knowledge required to use the device safely; f) means to identify the user and document their proficiency with the device and related educational objectives; and g) storage capability either on-site or remotely for maintaining records.

Figure 3:
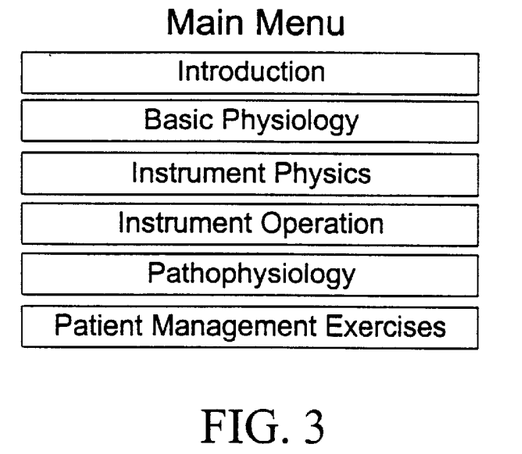
FIG. 3 shows a sample main menu for the training software of the present invention.
Figure 4:
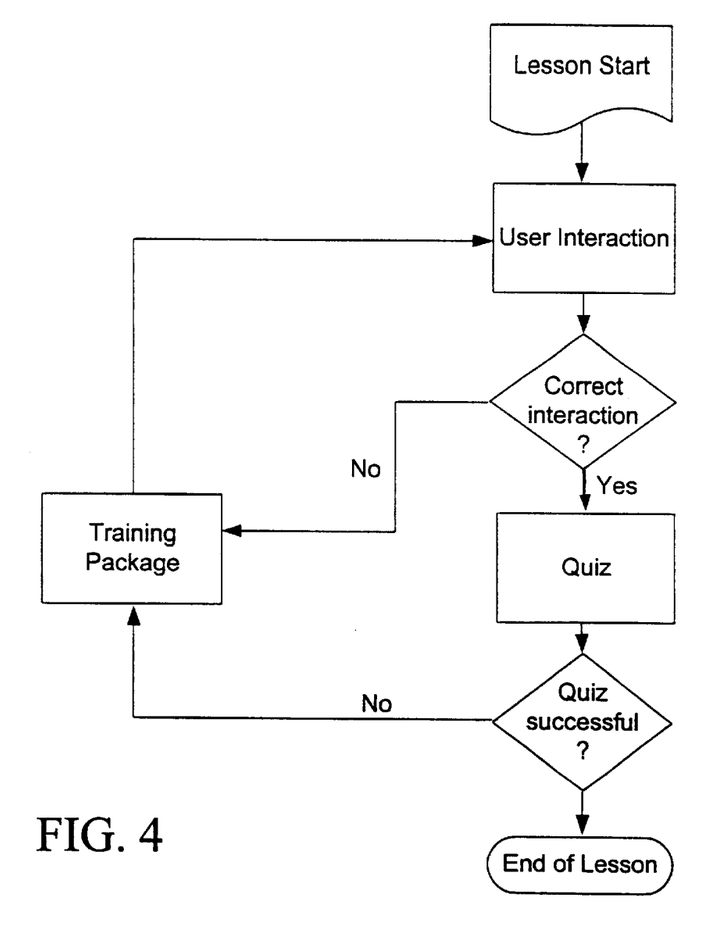
FIG. 4 shows an overview of the preferred steps of training for a medical device using the method and apparatus of the present invention.

In operation of a preferred embodiment, as illustrated by the main menu of FIG. 3 and the flowchart of FIG. 4, the end-user uses the PTT to learn how to use a newly introduced device, or to refresh skills on a device already in use. Satisfactory completion of the training exercise could be used for CEU credits and/or documentation of competency on the medical device, which would be especially valuable to institutions to guard against medical malpractice actions.

Referring now to FIG. 3, it is understood that all of the menus outlined herein may contain submenus. Basic Physiology describes the applicable physiology related to the medical device that the user is being trained on. Instrument Physics explains the physics related to a device. Instrument Operation describes how the device is used, how the buttons function, etc. Pathophysiology is a section that describes the use of the device with patients in different disease states. In the Patient Management Exercises section, the user will have to manage several aspects of a simulated patient.

For example, an oscillometric non-invasive blood pressure monitor is desired to be trained on. In this example, Basic Physiology would have a section on the cardiovascular system, blood pressure generation, definitions of systolic, diastolic, and mean blood pressure, etc. The Instrument Physics section explains how pressure is measured, how the oscillometric method works, etc. Instrument Operation section explains the button (input controls) of a specific blood pressure device (e.g., Johnson and Johnson Critikon Compact NIBP monitor). The Pathophysiology section would explain low and high blood pressure and some of the difficulty obtaining measurements and limitations of the technology. It may also deal with a shivering patient which will make the measurement more difficult to use. The Patient Management Exercise section would simulate using the device on a patient and responding appropriately to the data generated, including false readings.

The educational content of the training software preferably consists of three parts: 1) user interactions, 2) testing and quizzing, and 3) educational materials. The user will proceed through the sections by interacting with the device or by selecting options on the computer screen. When the correct interactions are made, the user will be quizzed to assure it was not a guess. When the user answers the quiz question(s) correctly, the next section of the lesson is shown. When the user either does not choose the correct information, or fails the quiz, the user is presented with an educational lesson specific for the current topic or learning objective. After the session, the user is asked again to do the initial interaction. This process is applicable to all the sections in the main menu and is outlined in FIG. 4.

In a more specific example, in operation, the end-user uses a password to access the PTT and then plugs the PTT into the intended medical device and the PTT automatically identifies the device and "loads" appropriate software. Alternately, the device is selected from a list by the user. Software for multiple medical devices could be stored in memory, on removable media, on a Web accessible server, or at the institution and could be loaded into the PTT through any suitable means such as via a "dock".

Once the device to be trained on is identified, the user is taken through a series of questions regarding the area or field in which the device is commonly used. For instance, if the device is an infusion pump, general information required to use pumps appropriately, such as calculation of drug infusion rates, drug interactions, etc. would be tested. The degree of testing would be related to the ability to answer questions appropriately. Areas of competency can be quickly ascertained and reviewed quickly, while areas of weakness could be reviewed in greater depth.

After completion of the general knowledge section, the end-user is prompted on proper use of the infusion pump. After reviewing the features of the pump, examples could be given where the user is required to do actual entry on the device. The computer would follow the keystrokes and when performed appropriately would prompt the user to go on to another function of the device. When inappropriate keystrokes are entered, the device would prompt the user to use the pump appropriately by demonstrating on an emulation of the pump presented on the tablet display. The user would continue to be given examples until the user could demonstrate proficiency with the device. The computer would track the appropriate and inappropriate use and would introduce additional refresher information on the areas of weakness.

Several levels of training on the device can be introduced. Initially, the PTT could take the user through a series of exercises where appropriate entry could be demonstrated on the tablet and mimicked by the user on the device. At a more advance level, the PTT could give problems and track the user's keystrokes on the device, giving remediation as required. At the highest level, the user would be required to use the device without any prompts from the PTT.

When full competence on the device is demonstrated, this information can be stored in the tablet or sent to a central location where competency records are kept.

In another embodiment, the PTT can interface with multiple devices simultaneously for exercises involving false data from one device. Moreover, a plurality of PTTs can be interfaced via a communications network for conducting group instruction, training, monitoring, and the like.

Devices for training can generally be classified into three categories: a) mechanical devices with no electronic communications, b) electronic/electro-mechanical devices without direct communication, or c) electronic devices with communication ports. The following examples illustrate typical scenarios for using the PTT with such devices:

CATEGORY EXAMPLE 1

Mechanical Devices

For this category of devices, the PTT will not be connected to the device, but rather will be used in conjunction with the device. Some examples include the following:
  a) Chest drainage systems.
  b) Catheter insertions (Central lines, Peripheral catheters, Foley catheters).
  c) Other drainage devices ("G" tubes—gastrostomy tubes, Penrose drains, Nasogastric tube systems, Suction drainage systems).
  d) Other tubes (Endotracheal tubes, Tracheostomy tubes).

CATEGORY EXAMPLE 2

Electronic Devices without Direct Communications

For this category of devices, the PTT will not be connected to the device, but rather will be used in conjunction with the device. Some examples include the following:
  a) Diagnostic devices—especially patient devices (Home glucose monitors, Coagulation monitors, Cholesterol monitors, Urine monitors, Respiratory monitors).
  b) Any hospital electronic therapeutic device without communications capabilities (Infusion pumps, Electronic suction systems, Cautery devices).

CATEGORY EXAMPLE 3

Electronic Devices with Communication Ports

For this category of devices, the PTT will connect to and interface with the device, Some examples include the following:
  a) Therapeutic devices (Infusion pumps, Ventilators, Defibrillators, Pacemakers, Stimulators, Heart-lung (bypass) machines).
  b) Diagnostic devices:
    i) Vital signs monitors (ECG, Temperature, Blood pressure—Noninvasive/Invasive, Pulse oximeters, Pulse rate)
    ii) End tidal carbon dioxide monitors
    iii) Respiratory monitors
    iv) Metabolic carts
    v) ECG machines
    vi) EEG machines
    vii) Fetal monitoring systems
    viii) Ultrasound devices
    ix) Imaging systems The following is a specific scenario for using the PTT to train on an infusion pump under this category of devices:

In this scenario, the manufacturer of a new infusion pump wants to introduce it into the healthcare market. As part of the marketing strategy, the company uses the PTT of the present invention in conjunction with the infusion pump for training. The PTT can be connected directly to the pump as well as a company web site. When the pumps are introduced into the hospital, initial training is done by the conventional method of lectures and practice sessions. Additionally, the end users have the opportunity to learn the features of the pump in far greater detail and at their own pace by interacting with the pump and receiving feedback from the PTT. Having the PTT available allows the end users to improve their knowledge of the device and to seek additional practice at virtually any time without having to schedule additional formal training sessions.

As part of the training procedure, a series of general, broad questions will be asked by the PTT software. Areas of deficiency in basic knowledge required to use infusion pumps correctly will be documented, and tutoring software in the PTT can automatically test and tutor the user until they have gained proficiency. The user can then go on to develop skills in all aspects of the infusion pump by interacting with the device and the PTT.

All of this information can be stored locally, or the manufacturer can provide the service to maintain proficiency and training records. Taken to its fullest extent, the PTT can be developed for the full breadth of devices found in the hospital and the training software can be customized to the needs of the end users. After training on the PTT, the end users can integrate these skills on full scale simulators either individually or as part of team exercises.

This approach allows for a markedly expanded knowledge base of both general and device specific information related to medical devices. Further, extensive documentation, including that of tutoring where necessary, can dramatically reduce injury to patients and the risk of malpractice claims.

It should be understood that the examples and embodiments described herein are for illustrative purposes only and that various modifications or changes in light thereof will be suggested to persons skilled in the art and are to be included within the spirit and purview of this application. Specifically, the PPT of the present invention is intended to cover devices in other fields, not just medical devices.

We claim:

1. A training interface apparatus for teaching proper use of a variety of devices, comprising:
   (a) a storage device;
   (b) a processor connected to the storage device;
   (c) a computer program under control of the processor that provides, for each of a plurality of devices, a corresponding interactive training session to a user, wherein the interactive training session resides on the storage device of said training interface apparatus and is automatically launched when a device is connected to the training interface apparatus through a communications interface, and wherein the interactive training session comprises at least one lesson related to the operation of the device and tracks progress of a user and adjusts the lessons based on said progress;
   (d) a user interface under control of the processor for receiving input from the user, wherein the user interface detects and interprets inputs made into the device through the communications interface operatively connected between the device and the training interface apparatus; and
   (e) a display unit operable to display an output corresponding to the interactive training session and a simulated image that resembles the device.

2. The apparatus of claim 1 wherein the interactive training session is loaded onto a storage device of said training apparatus from an external communications network.

3. The apparatus of claim 1 wherein the interactive training session is loaded onto a storage device of said training apparatus from at least one of said plurality of devices.

4. The apparatus of claim 1 wherein the interactive training session is loaded onto a storage device of said training apparatus from a removable storage media.

5. The apparatus of claim 1 wherein the simulated image comprises graphical representations of the controls.

6. The apparatus of claim 5 wherein the graphical representations of the controls are actuated by the user interface.

7. The apparatus of claim 1 wherein the simulated image comprises representations of the output of the device.

8. The apparatus of claim 1 wherein the user interface further comprises an external input device interfaced with the training interface apparatus.

9. The apparatus of claim 1 wherein the user interface further comprises an integrated input device of the training interface apparatus.

10. The apparatus of claim 1 wherein the interactive training session comprises a plurality of lessons for medical device training, wherein at least one lesson is selected from:
    (a) a lesson on applicable physiology related to the device;
    (b) a lesson on instrument physics related to the device;
    (c) a lesson on operation of the device, including inputs and outputs;
    (d) a lesson on pathophysiology that describes the use of the device with patients in different disease states; or
    (e) a lesson on patient management exercises which manages aspects of a simulated patient.

11. The apparatus of claim 1 wherein the interactive training session comprises a plurality of lessons for medical device training comprising:
    (a) a lesson on applicable physiology related to the device;
    (b) a lesson on instrument physics related to the device; and
    (c) a lesson on operation of the device, including inputs and outputs.

12. An apparatus for teaching proper use of a variety of devices, comprising
    a storage device; and
    a processor connected to the storage device,
    the storage device storing a program for controlling the processor; and
    the processor operative with the program to perform the steps of:
    (a) identifying a device interfaced with a training interface apparatus;
    (b) loading training software specific to the identified device on said apparatus;
    (c) running the training software, wherein the training software comprises an interactive training session comprising at least one lesson related to operation of the device;
    (d) receiving inputs representing operation of controls of the identified device from a communications interface operatively connected between the device and the training interface apparatus for detecting inputs made into the device itself;

(e) displaying an output corresponding to the interactive training session and a simulated image that resembles the device;

(f) tracking progress of the operation of controls; and (g) adjusting the training software based on said progress.

13. The apparatus of claim 12 wherein the interactive training session comprises a plurality of lessons for medical device training, wherein at least one lesson is selected from:

(a) a lesson on applicable physiology related to the device;

(b) a lesson on instrument physics related to the device;

(c) a lesson on operation of the device, including inputs and outputs;

(d) a lesson on pathophysiology that describes the use of the device with patients in different disease states; or (e) a lesson on patient management exercises which manages aspects of a simulated patient.

14. A computer readable media containing program instructions for teaching proper use of a variety of devices, said computer readable media comprising:

first computer program code for identifying a device connected to a computer system;

second computer program code for loading training software specific to the identified device on said computer system;

third computer program code for running the training software, wherein the training software comprises an interactive training session comprising at least one lesson related to operation of the device;

fourth computer program code for receiving inputs representing operation of controls of the identified device from a communications interface operatively connected between the device and the training interface apparatus for detecting inputs made into the device itself, fifth computer program code for displaying an output corresponding to the interactive training session and a simulated image that resembles the device;

sixth computer program code for tracking progress of the operation of controls; and seventh computer program code for adjusting the training software based on said progress.

15. The computer readable media of claim 14 wherein the interactive training session comprises a plurality of lessons for medical device training, wherein at least one lesson is selected from:

(a) a lesson on applicable physiology related to the device;

(b) a lesson on instrument physics related to the device;

(c) a lesson on operation of the device, including inputs and outputs;

(d) a lesson on pathophysiology that describes the use of the device with patients in different disease states; or (e) a lesson on patient management exercises which manages aspects of a simulated patient.

16. A method for teaching proper use of a variety of devices comprising:

(a) identifying a device interfaced with a training interface apparatus, said training apparatus comprising a processor, a storage unit, a display, and at least one communications interface;

(b) loading training software specific to the identified device on said apparatus;

(c) running the training software wherein the training software comprises an interactive training session comprising at least one lesson related to operation of the device;

(d) receiving inputs representing operation of controls of the identified device from a communications interface operatively connected between the device and the training interface apparatus for detecting inputs made into the device itself;

(e) displaying an output corresponding to the interactive training session and a simulated image that resembles the device;

(f) tracking progress of the operation of controls; and (g) adjusting the interactive training session based on said progress.

17. The method of claim 16 wherein the interactive training session comprises a plurality of lessons for medical device training, wherein at least one lesson is selected from:

(a) a lesson on applicable physiology related to the device;

(b) a lesson on instrument physics related to the device;

(c) a lesson on operation of the device, including inputs and outputs;

(d) a lesson on pathophysiology that describes the use of the device with patients in different disease states; or (e) a lesson on patient management exercises which manages aspects of a simulated patient.

18. The apparatus of claim 16 wherein the interactive training session comprises a plurality of lessons for medical device training comprising:

(a) a lesson on applicable physiology related to the device;

(b) a lesson on instrument physics related to the device; and (c) a lesson on operation of the device, including inputs and outputs.

19. A computer program product comprising a computer storage medium having a computer program therein for teaching proper use of a variety of devices, said computer program performing the steps of:

(a) identifying a device interfaced with a training interface apparatus;

(b) loading training software specific to the identified device on said apparatus;

(c) running the training software, wherein the training software comprises an interactive training session comprising at least one lesson related to operation of the device;

(d) receiving inputs representing operation of controls of the identified device from a communications interface operatively connected between the device and the training interface apparatus for detecting inputs made into the device itself;

(e) displaying an output corresponding to the interactive training session and a simulated image that resembles the device;

(f) tracking progress of the operation of controls; and (g) adjusting the training software based on said progress.

20. The computer program product of claim 19 wherein the interactive training session comprises a plurality of lessons for medical device training, wherein at least one lesson is selected from:

(a) a lesson on applicable physiology related to the device;

(b) a lesson on instrument physics related to the device;

(c) a lesson on operation of the device, including inputs and outputs;

(d) a lesson on pathophysiology that describes the use of the device with patients in different disease states; or (e) a lesson on patient management exercises which manages aspects of a simulated patient.

* * * * *

UNITED STATES PATENT AND TRADEMARK OFFICE
CERTIFICATE OF CORRECTION

PATENT NO. : 6,535,714 B2
DATED : March 18, 2003
INVENTOR(S) : Richard J. Melker and Johannes H. van Oostrom It is certified that error appears in the above-identified patent and that said Letters Patent is hereby corrected as shown below:

<u>Title page,</u>
Item [60], "Jun. 30, 2002." should read -- Jun. 30, 2000. --

<u>Column 1,</u>
Line 6, "Jun. 30, 2002." should read -- Jun. 30, 2000. --

Signed and Sealed this

Eleventh Day of November, 2003

JAMES E. ROGAN
*Director of the United States Patent and Trademark Office*